(12) United States Patent
Denis et al.

(10) Patent No.: US 8,796,191 B2
(45) Date of Patent: Aug. 5, 2014

(54) GREASE COMPOSITION

(75) Inventors: Richard A. Denis, Auburn Township, OH (US); Stephen J. Nolan, Duffield (GB)

(73) Assignee: The Lubrizol Corporation, Wickliffe, OH (US)

( * ) Notice: Subject to any disclaimer, the term of this patent is extended or adjusted under 35 U.S.C. 154(b) by 471 days.

(21) Appl. No.: 11/847,389

(22) Filed: Aug. 30, 2007

(65) Prior Publication Data

US 2009/0062165 A1    Mar. 5, 2009

(51) Int. Cl.
| | | |
|---|---|---|
| *C10M 169/00* | (2006.01) | |
| *F16D 13/00* | (2006.01) | |
| *F16D 13/18* | (2006.01) | |
| *C10M 121/04* | (2006.01) | |
| *C10M 169/06* | (2006.01) | |
| *C04B 35/584* | (2006.01) | |
| *C04B 35/591* | (2006.01) | |
| *C04B 35/78* | (2006.01) | |
| *B29C 47/12* | (2006.01) | |
| *B82Y 30/00* | (2011.01) | |
| *B82Y 40/00* | (2011.01) | |
| *D01D 5/00* | (2006.01) | |

(52) U.S. Cl.
CPC ........... *C10M 121/04* (2013.01); *C10M 169/06* (2013.01); *C04B 35/584* (2013.01); *C04B 35/591* (2013.01); *C04B 35/78* (2013.01); *C10M 2201/02* (2013.01); *C10M 2201/0626* (2013.01); *C10M 2207/006* (2013.01); *C10M 2207/1285* (2013.01); *C10M 2207/40* (2013.01); *C10M 2207/401* (2013.01); *C10N 2230/40* (2013.01); *C10N 2210/01* (2013.01); *C10N 2210/02* (2013.01); *C10N 2210/03* (2013.01); *C10N 2220/082* (2013.01); *C10N 2230/06* (2013.01); *C10N 2230/52* (2013.01); *C10N 2230/64* (2013.01); *C10N 2250/10* (2013.01); *C10N 2250/12* (2013.01); *C10N 2270/00* (2013.01); *B29C 47/12* (2013.01); *B82Y 30/00* (2013.01); *B82Y 40/00* (2013.01); *D01D 5/0076* (2013.01); *F16D 13/18* (2013.01)

USPC ........... 508/172; 508/154; 508/178; 188/234; 188/250 G; 188/251 R; 192/107 T; 192/111.13; 192/75

(58) Field of Classification Search
USPC ......... 508/344, 304, 242, 283, 485, 532, 154, 508/452, 491, 137, 172, 178; 188/234, 188/250 G, 251 R; 192/75
See application file for complete search history.

(56) References Cited

U.S. PATENT DOCUMENTS

| | | | |
|---|---|---|---|
| 2,383,904 A | | 8/1942 | Zimmer |
| 2,394,907 A | * | 2/1946 | Gallay et al. .................. 508/539 |
| 2,659,695 A | | 1/1951 | Faust |
| 4,708,753 A | | 11/1987 | Forsberg ............................ 149/2 |
| 5,462,683 A | * | 10/1995 | Kinoshita et al. ............. 508/137 |
| 5,681,800 A | * | 10/1997 | Duncan et al. ................. 508/485 |
| 2006/0252655 A1 | * | 11/2006 | Iso et al. ....................... 508/154 |

FOREIGN PATENT DOCUMENTS

| | | |
|---|---|---|
| JP | 1999228983 | 8/1999 |
| WO | WO 2004/031328 | 4/2004 |
| WO | WO 2005/097952 | 10/2005 |
| WO | 2008/058053 A2 | 5/2008 |

OTHER PUBLICATIONS

Search Report from corresponding PCT Application No. PCT/US2008/073948 mailed Mar. 3, 2009.

Florea, O. et al.: "The Influence of the Lubricating Fluid Type on the Properties of the Biodegradable Greases", S.C. ICERP S.A., B-dul Republicii nr. 291 a, cod 2000 Ploiesti, Romania; e-mail office@icerp.ro.

* cited by examiner

*Primary Examiner* — Prem C Singh
*Assistant Examiner* — Chantel Graham
(74) *Attorney, Agent, or Firm* — Christopher D. Hilker

(57) ABSTRACT

The disclosed invention relates to a biodegradable grease composition. The grease composition comprises the reaction product of a dispersion of metal oxide and/or hydroxide particulates with at least one animal or vegetable oil. The dispersion comprises an organic medium and has a water content of up to about 0.5% by weight water. The particulates have a mean particle size up to about 15 microns. A process for making a grease composition using a dispersion of metal oxide and/or hydroxide particulates is disclosed.

20 Claims, No Drawings

GREASE COMPOSITION

TECHNICAL FIELD

This invention relates to grease compositions, and more specifically to grease compositions made from animal or vegetable oils. These grease compositions may be referred to as being biodegradable and therefore environmentally friendly.

BACKGROUND

Grease compositions are often prepared using mineral oils and thickeners such as lithium 12-hydroxystearate. A problem with these grease compositions is that their biodegradability is limited and thus they are not considered to be environmentally friendly.

SUMMARY

This invention provides a solution to the foregoing problems. With the present invention it has been discovered that if a metal base (e.g., lithium hydroxide monohydrate) were dispersed in an organic medium with a water content of up to about 0.5% by weight, and the base was in the form of particulates with a mean particle size up to about 15 microns, the resulting dispersion could be readily mixed with an animal or vegetable oil. The base could then be reacted with one or more indigenous carboxylic acids and/or esters thereof in the animal or vegetable oil and/or with one or more added carboxylic acids and/or esters thereof under conditions sufficient to thicken the oil to a grease consistency. The resulting grease composition would be biodegradable.

The present invention relates to a biodegradable grease composition which comprises the reaction product of a dispersion of metal oxide and/or hydroxide particulates with at least one animal and/or vegetable oil, the dispersion comprising an organic medium and particulates of the metal oxide and/or hydroxide dispersed in the organic medium, the dispersion having a water content of up to about 0.5% by weight, the particulates having a mean particle size up to about 15 microns, the reaction product having a grease consistency. In one embodiment, at least one added carboxylic acid and/or ester thereof may be added to the animal and/or vegetable oil during the reaction of the dispersion of metal oxide and/or hydroxide particulates with the animal and/or vegetable oil.

The invention also relates to a process for making a grease composition. The process comprises: forming a slurry comprising metal oxide and/or hydroxide solids, water and an organic medium; milling the slurry to form a water-in-oil emulsion comprising metal oxide and/or hydroxide particulates; dehydrating the emulsion to form a dispersion of the metal oxide and/or hydroxide particulates in the organic medium; and mixing the dispersion with at least one animal and/or vegetable oil under conditions sufficient to thicken the animal and/or vegetable oil to a grease consistency. In one embodiment, at least one added carboxylic acid and/or ester thereof may be added to the mixture of the dispersion with the at least one animal and/or vegetable oil to enhance the thickening of the animal and/or vegetable oil.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural. All combinations specified in the claims may be combined in any manner.

The term "biodegradable" may be used herein to refer to a substance that can be decomposed by natural influences such as biological action or sunlight.

The term "indigenous carboxylic acid and/or ester thereof" may be used herein to refer to any carboxylic acid and/or ester thereof that occurs naturally in the animal and/or vegetable oil used to form the inventive biodegradable grease composition.

The term "added carboxylic acid and/or ester thereof" may be used to include any carboxylic acid and/or ester thereof that is added to a reaction mixture comprising the animal and/or vegetable oil used to form the inventive biodegradable grease composition.

The term "saponification" may be used herein to refer to the conversion of an ester into an alcohol and an acid salt.

The term "slurry" may be used herein to refer to a mixture of metal hydroxide solids (e.g., anhydrous lithium hydroxide and/or lithium hydroxide monohydrate solids) and an organic medium (e.g., an oil or a mixture of an oil and one or more surfactants).

The term "dispersion" may be used herein to refer to a liquid medium (e.g., an organic medium comprising an oil, a mixture of oil and one or more surfactants, etc.) with individual solid metal hydroxide particulates (e.g., anhydrous lithium hydroxide and/or lithium hydroxide monohydrate particulates) generally separated from one another and being reasonably evenly distributed throughout the liquid medium.

The term "stable dispersion" may be used herein to refer to a dispersion wherein less than about 1% by weight of the solid particulates drop out of the dispersion after 60 days, and in one embodiment after 240 days, when the dispersion is maintained at 20° C. without agitation.

The term "high solids dispersion" may be used herein to refer to a dispersion with a metal (e.g., lithium) content of at least about 1.5% by weight, and in one embodiment at least about 3% by weight, and in one embodiment at least about 5% by weight, and in one embodiment at least about 7% by weight, and in one embodiment at least about 10% by weight, and in one embodiment at least about 15% by weight. In one embodiment the concentration of metal may be in the range from about 1.5% to about 32% by weight, and in one embodiment in the range from about 1.5 to about 30% by weight, and in one embodiment in the range from about 2 to about 25% by weight, and in one embodiment in the range from about 2.5 to about 20% by weight, and in one embodiment in the range from about 3% to about 18% by weight. The term "high solids dispersion" may be used to refer to a dispersion containing at least about 10% by weight metal oxide and/or hydroxide (e.g., lithium oxide, anhydrous lithium hydroxide and/or lithium hydroxide monohydrate) particulates, and in one embodiment at least about 12% by weight metal oxide and/or hydroxide particulates, and in one embodiment at least about 15% by weight metal oxide and/or hydroxide particulates, and in one embodiment at least about 20% by weight metal oxide and/or hydroxide particulates, and in one embodiment at least about 25% by weight metal oxide and/or hydroxide particulates, and in one embodiment at least about 30% by weight metal oxide and/or hydroxide particulates, and in one embodiment at least about 35% by weight metal oxide and/or hydroxide particulates, and in one embodiment at least about 40% by weight metal oxide and/or hydroxide particulates. The concentration of metal oxide and/or hydroxide particulates may be up to about 62% by weight, and in one embodiment up to about 60% by weight, and in one embodiment up to about 55% by weight, and in one embodiment up to about 50% by weight, and in one embodiment up to about 45% by weight, and in one embodiment up to about 40% by weight. The concentration of metal oxide and/or hydroxide particulates in the high solids dispersion may be in the range from about 10% to about 62% by weight, and in one embodiment from about 12% to about 60% by weight.

The term "hydrocarbyl," when referring to groups attached to the remainder of a molecule, may be used herein to refer to groups having a purely hydrocarbon or predominantly hydrocarbon character within the context of this invention. These groups may include the following:

(1) Purely hydrocarbon groups; that is, aliphatic, alicyclic, aromatic, aliphatic- and alicyclic-substituted aromatic, aromatic-substituted aliphatic and alicyclic groups, and the like, as well as cyclic groups wherein the ring is completed through another portion of the molecule (that is, any two indicated substituents may together form an alicyclic group). Examples may include methyl, octyl, cyclohexyl, phenyl, etc.

(2) Substituted hydrocarbon groups; that is, groups containing non-hydrocarbon substituents which do not alter the predominantly hydrocarbon character of the group. Examples may include hydroxy, nitro, cyano, alkoxy, acyl, etc.

(3) Hetero groups; that is, groups which, while predominantly hydrocarbon in character, contain atoms other than carbon in a chain or ring otherwise composed of carbon atoms. Examples may include nitrogen, oxygen and sulfur.

In general, no more than about three substituents or hetero atoms, and in one embodiment no more than one, may be present for each 10 carbon atoms in the hydrocarbyl group.

The term "lower" may be used herein in conjunction with terms such as hydrocarbyl, alkyl, alkenyl, alkoxy, and the like, may describe such groups which contain a total of up to 7 carbon atoms.

The term "oil-soluble" may be used herein to refer to a material that is soluble in mineral oil to the extent of at least about 0.5 gram per liter at 25° C.

The term "insoluble" may be used herein to refer to a material that is insoluble in mineral oil at 25° C. or is soluble in mineral oil at 25° C. to the extent of up to about 0.5 gram per liter.

The term "TBN" may be used herein to refer to total base number. This is the amount of acid (perchloric or hydrochloric) needed to neutralize all or part of a material's basicity, expressed as milligrams of KOH per gram of sample.

The term "soap" may be used herein to refer to the reaction product of a metal oxide and/or hydroxide (e.g., lithium hydroxide) with a carboxylic acid and/or ester thereof to yield a metal carboxylate.

The dispersion that may be used in accordance with the invention may be a high solids dispersion. The dispersion may comprise metal oxide and/or hydroxide particulates dispersed in an organic medium. The organic medium may comprise at least one oil and at least one surfactant. The metal oxide and/or hydroxide may comprise an alkali metal, alkaline earth metal, aluminum, or a mixture of two or more thereof. The metal oxide and/or hydroxide may comprise lithium, sodium, potassium, calcium, magnesium, barium, aluminum, or a mixture of two or more thereof.

The metal hydroxide may be represented by the formula $M(OH)_{1-3} \cdot xH_2O$, wherein M is a metal ion; "1-3" means 1, 2, or 3 hydroxyl groups, and x can be a fraction in the range from 0 to 1. When x=1 the metal hydroxide is in the form of the monohydrate. When x=0, the metal hydroxide is anhydrous. When x is greater than zero but less than 1, the metal hydroxide may be partially, substantially or wholly anhydrous. A partially anhydrous metal hydroxide may be when x is in the range from about 0.9 to about 0.5, and in one embodiment from about 0.85 to about 0.55, and in one embodiment from about 0.6 to about 0.7. A substantially anhydrous metal hydroxide may be when x is less than about 0.5, and in one embodiment less than about 0.3, and in one embodiment less than about 0.1, but greater than about 0.02. A wholly anhydrous metal hydroxide may have x in the range from about 0.02 to about 0, and in one embodiment in the range from about 0.01 to about 0.

The metal oxide and/or hydroxide particulates may have a mean particle size in the range up to about 15 microns, and in one embodiment in the range from about 20 nanometers (nm) to about 15 microns, and in one embodiment in the range from about 20 nm to about 10 microns, and in one embodiment in the range from about 20 nm to about 5 microns, and in one embodiment in the range from about 20 nm to about 1 micron, and in one embodiment in the range from about 20 to about 900 nm, and in one embodiment in the range from about 20 to about 600 nm, and in one embodiment in the range from about 20 to about 300 nm. At least about 70% by weight, and in one embodiment at least about 80% by weight, and in one embodiment at least about 90% by weight, and in one embodiment at least about 95% by weight of the metal oxide and/or hydroxide particulates may have a particle size up to about 20 microns, and in one embodiment up to about 10 microns, and in one embodiment up to about 1 micron. Up to about 100% by weight, and in one embodiment up to about 99% by weight, and in one embodiment up to about 97% by weight, and in one embodiment up to about 95% by weight of the metal oxide and/or hydroxide particulates may have a particle size in the range up to about 20 microns, and in one embodiment up to about 15 microns, and in one embodiment up to about 10 microns, and in one embodiment up to about 5 microns, and in one embodiment up to about 3 microns, and in one embodiment up to about 2 microns.

The dispersion may have a TBN in the range from about 130 to about 1700, and in one embodiment in the range from about 500 to about 900.

The oil that may be used in the dispersion may comprise one or more oils of lubricating viscosity, including natural oils, synthetic oils, and mixtures thereof. The oil may be produced by gas-to-liquid processes such as Fischer-Tropsch reactions. The oil may comprise one or more poly alphaolefins. The oil used in the dispersion may be referred to as a dispersion oil.

The natural oils may include animal oils and vegetable oils (e.g., castor oil, soybean oil, lard oil) as well as mineral lubricating oils such as liquid petroleum oils and solvent-treated or acid-treated mineral lubricating oils of the paraffinic, naphthenic or mixed paraffinic-naphthenic types. The oils may be biodegradable oils, for example, natural oils such as animal or vegetable oils which are biodegradable. Oils of lubricating viscosity derived from coal or shale may be useful. Synthetic lubricating oils that may be useful may include hydrocarbon oils such as polymerized and interpolymerized olefins (e.g., polybutylenes, polypropylenes, propyleneisobutylene copolymers,); poly(1-hexenes), poly(1-octenes), poly(1-decenes), and mixtures thereof; alkyl-benzenes (e.g., dodecylbenzenes, tetradecylbenzenes, dinonylbenzenes, di-(2-ethylhexyl)-benzenes); polyphenyls (e.g., biphenyls, terphenyls, alkylated polyphenyls); alkylated diphenyl ethers and alkylated diphenyl sulfides and the derivatives, analogs and homologs thereof.

Alkylene oxide polymers and interpolymers and derivatives thereof where the terminal hydroxyl groups have been modified by esterification, and etherification, constitute another class of synthetic lubricating oils that may be used.

These may be exemplified by the oils prepared through polymerization of ethylene oxide or propylene oxide, the alkyl and aryl ethers of these polyoxyalkylene polymers (e.g., methyl-polyisopropylene glycol ether having a number average molecular weight of 1000, diphenyl ether of polyethylene glycol having a molecular weight of 500-1000, diethyl ether of polypropylene glycol having a molecular weight of 1000-1500) or mono- and polycarboxylic esters thereof, for example, the acetic acid esters, mixed $C_{3-8}$ fatty acid esters, or the $C_{13}$ Oxo acid diester of tetraethylene glycol.

Another class of synthetic lubricating oils that may be used may comprise the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, and alkenyl malonic acids) with a variety of alcohols (e.g., butyl alcohol, hexyl alcohol, dodecyl alcohol, 2-ethylhexyl alcohol, ethylene glycol, diethylene glycol monoether, and propylene glycol) Specific examples of these esters include dibutyl adipate, di-(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters that may be useful may include synthetic oils made from $C_5$ to $C_{22}$ monocarboxylic acids and polyols such as neopentyl glycol, trimethylol propane, and pentaerythritol, or polyol ethers such as dipentaerythritol, and tripentaerythritol. Other examples of these types of esters may include biobased esters such as mixed fatty acid and complex esters of trimethyolpropane and/or neopentyl glycol.

Silicon-based oils such as the polyalkyl-, polyaryl-, polyalkoxy-, or polyaryloxy-siloxane oils and silicate oils may comprise another useful class of synthetic lubricating oils (e.g., tetraethyl silicate, tetraisopropyl silicate, tetra-(2-ethylhexyl)silicate, tetra-(4-methylhexyl)silicate, tetra-(p-tert-butylphenyl) silicate, hexyl-(4-methyl-2-pentoxy)disiloxane, poly(methyl)siloxanes, and poly-(methylphenyl)siloxanes). Other synthetic lubricating oils may include liquid esters of phosphorus-containing acids (e.g., tricresyl phosphate, trioctyl phosphate, and the diethyl ester of decane phosphonic acid), and polymeric tetrahydrofurans.

The polyalphaolefins (PAOs) may be derived from monomers having from about 4 to about 30 carbon atoms, and in one embodiment from about 4 to about 20, and in one embodiment from about 6 to about 16 carbon atoms. Examples of useful PAOs may include those derived from 1-hexene, 1-octene, 1-decene, or a mixture of two or more thereof. These PAOs may have a viscosity in the range from about 1.5 to about 150 mm$^2$/s (cSt) at 100° C. The PAOs may comprise hydrogenated hydrocarbons.

Unrefined, refined and re-refined oils, either natural or synthetic (as well as mixtures of two or more of any of these) of the type disclosed hereinabove may be used. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, and the like. Re-refined oils may be obtained by processes similar to those used to obtain refined oils applied to refined oils which have been already used in service. The re-refined oils may also be known as reclaimed or reprocessed oils and often are additionally processed by techniques directed to removal of spent additives and oil breakdown products.

Oils of lubricating viscosity that may be used may be defined as specified in the American Petroleum Institute (API) Base Oil Interchangeability Guidelines. The five base oil groups are as follows:

| Base Oil Category | Sulphur (%) | | Saturates (%) | Viscosity Index |
|---|---|---|---|---|
| Group I | >0.03 | and/or | <90 | 80-120 |
| Group II | ≤0.03 | and | ≥90 | 80-120 |
| Group III | ≤0.03 | and | ≥90 | ≥120 |
| Group IV | | All polyalphaolefins (PAOs) | | |
| Group V | | All others not included in Groups I, II, III, or IV | | |

Groups I, II, and III are mineral oil base stocks. The oil of lubricating viscosity may be a Group I, II, III, IV or V oil, or a mixture of two or more thereof.

The surfactants that may be used in the dispersion may comprise one or more ionic and/or non-ionic compounds. The ionic compounds may be cationic and/or anionic compounds. These compounds may have a hydrophilic lipophilic balance (HLB) up to about 20, and in one embodiment in the range from about 1 to about 18, and in one embodiment in the range from about 1 to about 14, and in one embodiment in the range from about 1 to about 10, and in one embodiment in the range from about 1 to about 8, and in one embodiment in the range from about 2.5 to about 6.

Examples of surfactants that may be used are disclosed in *McCutcheon's Emulsifiers and Detergents*, 1993, North American & International Edition. Examples may include alkanolamides, alkylarylsulphonates, amine oxides, poly (oxyalkylene) compounds, including block copolymers comprising alkylene oxide repeat units (e.g., Pluronic™), carboxylated alcohol ethoxylates, ethoxylated alcohols, ethoxylated alkyl phenols, ethoxylated amines and amides, ethoxylated fatty acids, ethoxylated fatty esters and oils, fatty esters, glyceryl esters, glycol esters, imidazoline derivatives, lecithin and derivatives, lignin and derivatives, monoglycerides and derivatives, olefin sulphonates, phosphate esters and derivatives, propoxylated and ethoxylated fatty acids or alcohols or alkyl phenols, sorbitan derivatives, sucrose esters and derivatives, sulphates or alcohols or ethoxylated alcohols or fatty esters, polyisobutylene substituted succinimide and derivatives thereof, sulphonates of dodecyl and tridecyl benzenes or condensed naphthalenes or petroleum, sulphosuccinates and derivatives, tridecyl and dodecyl benzene sulphonic acids, and mixtures of two or more thereof.

The surfactant may comprise an alkylated benzene sulphonate of an alkali metal or alkaline earth metal. The alkyl group may contain from about 8 to about 20 carbon atoms, and in one embodiment from about 10 to about 15 carbon atoms. The alkyl group may be dodecyl. The alkali metal may be lithium, potassium or sodium. The alkaline earth metal may be calcium or magnesium. The surfactant may comprise one or more derivatives of a polyolefin. The polyolefins may include polyisobutylene; polypropylene; polyethylene; a copolymer derived from isobutene and butadiene; a copolymer derived from isobutene and isoprene; or mixtures of two or more thereof.

The polyolefin may be a derivative of polyisobutylene with a number average molecular weight of at least about 250, 300, 500, 600, 700, or 800, to about 5000 or more, often up to about 3000, 2500, 1600, 1300, or 1200. The polyolefin may be reacted with maleic anhydride to make a succinic anhydride or succinic acid derivative (hereinafter succinic may be abbreviated as "succan") that may be further reacted with polar groups such as an alkali metal, alcohol, alkanol amine, or amine to form a larger hydrophilic group on the surfactant. This type of surfactant is disclosed in U.S. Pat. No. 4,708,753. In one embodiment, less than about 5% by weight of the polyisobutylene used to make the succan derivative molecules may have an $\overline{M}_n$ that is less than about 250. The polyisobutylene used to make the succan derivative may have an $\overline{M}_n$ of at least about 700. The polyisobutylene used to make the succan derivative may contain at least about 30% terminal vinylidene groups, and in one embodiment at least about 60%, and in one embodiment at least about 75% or at least about 85% terminal vinylidene groups. The polyisobutylene used to make the succan derivative may have a polydispersity, $\overline{M}_w/\overline{M}_n$, greater than about 5, and in one embodiment from about 6 to about 20.

The polyisobutylene substituent of the polyisobutylene that is substituted with succinic acid or anhydride may have a number average molecular weight in the range from about 700 to about 3000, and in one embodiment in the range from about 1,500 to about 3,000, and in one embodiment in the range from about 1,800 to about 2,300, and in one embodiment in the range from about 700 to about 1300, in one embodiment about 800 to about 1000. The polyisobutylene-substituted succinic acid or anhydride may be characterized by about 1.0 to about 2.5, and in one embodiment about 1.3 to about 2.5, and in one embodiment about 1.7 to about 2.1, and in one embodiment about 1.0 to about 1.3, and in one embodiment about 1.0 to about 1.2 succinic groups per equivalent weight of the polyisobutylene substituent.

The surfactant may comprise a polyisobutylene substituted succinic acid, a polyisobutylene substituted succinic anhydride, a salt thereof, or a mixture thereof.

The surfactant may comprise a polyisobutenyl-dihydro-2,5-furandione ester with pentaerythritol. The surfactant may comprise a polyolefin amino ester, an alkyl benzene sulfonic acid, a polyisobutenyl succinic acid, a polyisobutenyl succinic anhydride and/or a propylamine ethoxylate.

The dispersion may comprise at least about 10% by weight of the metal hydroxide particulates, and in one embodiment at least about 12% by weight metal hydroxide particulates, and in one embodiment from about 12 to about 62% by weight metal hydroxide particulates, and in one embodiment from about 12 to about 60 percent by weight metal hydroxide particulates, and in one embodiment from about 12 to 50% by weight metal hydroxide particulates, and in one embodiment from about 12 to about 45% by weight metal hydroxide particulates, and in one embodiment from about 12 to about 40% by weight metal hydroxide particulates.

The dispersion may comprise metal (e.g., lithium) at a concentration in the range from about 1.5 to about 20% by weight, and in one embodiment from about 3 to about 18% by weight.

The dispersion may comprise from about 30 to about 90% by weight dispersion oil, and in one embodiment from about 35 to about 65% by weight oil.

The dispersion may comprise from about 1 to about 20% by weight surfactant, and in one embodiment from about 3 to about 12% by weight surfactant, and in one embodiment in the range from about 3 to about 6% by weight, and in one embodiment in the range from about 4 to about 12% by weight surfactant.

The dispersion may be prepared by a process comprising (A) forming a slurry comprising metal oxide and/or hydroxide solids, water and an organic medium; (B) milling the slurry to form a water-in-oil emulsion comprising metal oxide and/or hydroxide particulates; and (C) dehydrating the emulsion to form a dispersion of the metal oxide and/or hydroxide particulates in the organic medium. The organic medium may comprise at least one dispersion oil and at least one surfactant. The process may further comprise: mixing metal oxide and/or hydroxide solids with the dispersion of metal hydroxide particulates formed in (C) to form a dispersion mixture; and milling the dispersion mixture to form a second dispersion comprising metal oxide and/or hydroxide particulates. The process may further comprise dehydrating the metal oxide and/or hydroxide particulates to form partially, substantially or wholly anhydrous metal and/or hydroxide particulates.

The metal oxide and/or hydroxide solids used in step (A) may have a mean particle size in the range from about 100 to about 1200 microns, and in one embodiment in the range from about 150 to about 500 microns. The solids may be initially provided in larger particle sizes and ground to the desired size.

The concentration of metal oxide and/or hydroxide solids in the slurry may be in the range from about 10 to about 70% by weight, and in one embodiment in the range from about 30 to about 60% by weight, and in one embodiment in the range from about 40 to about 55% by weight. The concentration of water in the slurry may be in the range from about 5% to about 90% by weight, and in one embodiment from about 10% to about 70% by weight. The slurry may comprise from about 30 to about 90% by weight dispersion oil, and in one embodiment from about 35 to about 65% by weight oil. The slurry may comprise from about 1 to about 20% by weight surfactant, and in one embodiment from about 4 to about 12% by weight surfactant.

The slurry may be milled using one or more media mills, ball mills, roller mills, disintegrators, microfluidizers, jet mills, ultrasonic mills and/or homogenizers. The media mills may comprise one or more bead mills, sand mills, pebble mills and/or pearl mills. The media mills may use media (e.g., beads) having average diameters in the range from about 0.3 to about 2.5 mm. In one embodiment, two sequential media (e.g., bead) mills may be used, one employing media (e.g., beads) with an average diameter in the range from about 1.5 to about 2.5 mm, and in one embodiment in the range from about 1.8 to about 2.2 mm, and in one embodiment about 2 mm; and the other media (e.g., bead) mill employing media (e.g., beads) having an average diameter in the range from about 0.3 to about 0.8 mm, and in one embodiment in the range from about 0.4 to about 0.7 mm, and in one embodiment about 0.5 mm. The milling may be performed in a single milling step using a media (e.g., bead) mill employing media (e.g., beads) with an average diameter in the range from about 0.8 to about 1.2 mm, and in one embodiment about 1.0 mm.

The dispersion formed from the foregoing milling step may then be dehydrated to remove the emulsion water and optionally convert the metal oxide and/or hydroxide particulates to partially, substantially or wholly anhydrous metal oxide and/or hydroxide particulates. This may be done by heating the dispersion at a temperature in the range from about 80 to about 130° C., and in one embodiment in the range from about 90 to about 110° C. The pressure may be in the range from about 50 to about 500 millibars, and in one embodiment in the range from about 100 to about 300 millibars. This heating step may be conducted until the water content of the dispersion is up to about 0.5% by weight, and in one embodiment up to about 0.3% by weight, and in one embodiment up to about 0.1% by weight. The water content of the dispersion may be in the range from about 0.001% to about 0.5% by weight, and in one embodiment in the range from about 0.01% to about 0.5% by weight, and in one embodiment from about 0.01% to about 0.3% by weight. The dehydration step may be conducted using one or more strippers, rotary evaporators, falling film evaporators, thin film evaporators, wiped film evaporators, short path evaporators and/or distillation units.

The animal and/or vegetable oil may comprise any oil derived from animals or vegetables. The vegetables may include plant seeds, nuts, and the like. These oils may be chemically similar to fats with a difference being one of consistency at room temperature. As such, the term "animal and/or vegetable oil" may also be used herein to include animal or vegetable fat. These oils may comprise one or more indigenous carboxylic acids and/or esters thereof. The indigenous carboxylic acids and/or esters may include one or more glycerides of fatty acids such as oleic acid, palmitic acid, stearic acid, linoleic acid, linolenic acid, or a mixture of two or more thereof. The animal oil may comprise tallow, lard, stearic acid, or a mixture of two or more thereof. The animal oil may comprise fish oil, fish liver oil (e.g, cod liver oil), lard oil, sperm oil, or a mixture of two or more thereof. The vegetable oil may comprise soybean oil, cottonseed oil, coconut oil, palm oil, palm kernel oil, corn oil, olive oil, rapeseed oil, sunflower seed oil, or a mixture of two or more thereof.

The grease compositions may be made by mixing the dispersion with at least one animal and/or vegetable oil, and reacting the metal oxide and/or hydroxide particulates in the dispersion with one or more indigenous carboxylic acids and/or esters thereof in the animal and/or vegetable oil under conditions sufficient to thicken the oil to a grease consistency. In one embodiment, the grease composition may be made by mixing the dispersion with at least one animal and/or vegetable oil and at least one added carboxylic acid and/or ester thereof, and reacting the metal oxide and/or hydroxide particulates in the dispersion with one or more indigenous carboxylic acids and/or esters thereof in the animal and/or vegetable oil and the at least one added carboxylic acids and/or the esters thereof, under conditions sufficient to thicken the oil to a grease consistency. The reaction of the metal oxide and/or hydroxide with the indigenous and/or added carboxylic acids and/or esters thereof may comprise a saponification reaction.

The grease composition may be made from a mixture comprising the animal and/or vegetable oil, the dispersion of metal oxide and/or hydroxide particulates, and optionally one or more added carboxylic acids and/or esters thereof. In one embodiment, the mixture may comprise from about 1 to about 20% by weight of the dispersion, and in one embodiment from about 2.5 to about 10% by weight of the dispersion; and from about 80 to about 99% by weight of the animal and/or vegetable oil, and in one embodiment from about 90 to about 97.5% by weight of the animal and/or vegetable oil. In one embodiment, the mixture may comprise from about 1 to about 20% by weight of the dispersion, and in one embodiment from about 2.5 to about 10% by weight of the dispersion; from about 45 to about 98% by weight of the animal and/or vegetable oil, and in one embodiment from about 65 to about 92.5% by weight of the animal and/or vegetable oil; and from about 1.1 to about 35% by of one or more added carboxylic acids and/or esters thereof, and in one embodiment from about 5 to about 25% by weight of one or more added carboxylic acids and/or esters thereof.

The added carboxylic acid and/or ester thereof may comprise any mono- or poly-carboxylic acid and/or ester thereof, or a mixture of two or more thereof. The polycarboxylic acid and/or ester may be a di-carboxylic acid and/or ester thereof. The ester of the dicarboxylic acid may be a diester. The carboxylic acid and/or ester may comprise one or more branched alicyclic or linear, saturated or unsaturated, mono- or poly-hydroxy substituted or unsubstituted carboxylic acids and/or esters. The carboxylic acid may comprise one or more acid chlorides. The carboxylic acid ester may comprise one or more esters of one or more of the carboxylic acids with one or more alcohols. The alcohols may be alcohols of 1 to about 5 carbon atoms. The carboxylic acids may contain from 2 to about 30 carbon atoms per molecule, and in one embodiment from about 4 to about 30 carbon atoms, and in one embodiment from about 8 to about 27 carbon atoms, and in one embodiment from about 12 to about 24 carbon atoms, and in one embodiment from about 16 to about 20 carbon atoms. The added carboxylic acid and/or ester thereof may comprise one or more monocarboxylic acids and/or esters thereof, one or more dicarboxylic acids and/or esters thereof, or a mixture of two or more thereof. The carboxylic acid may comprise an alkanoic acid. The carboxylic acid and/or ester thereof may comprise a mixture of one or more dicarboxylic acids and/or esters thereof and/or one or more polycarboxylic acids and/or esters thereof. The added carboxylic acid and/or ester thereof may comprise a mixture of one or more monocarboxylic acids and/or ester thereof, and one or more dicarboxylic and/or polycarboxylic acids and/or esters thereof. The weight ratio of dicarboxylic and/or polycarboxylic acid and/or ester thereof to monocarboxylic acid and/or ester thereof may be in the range from about 15:85 to about 40:60, and in one embodiment from about 20:80 to about 35:65, and in one embodiment from about 25:75 to about 35:65, and in one embodiment about 30:70.

The added carboxylic acid and/or ester thereof may comprise one or more hydroxystearic acids and/or esters of these acids. The acids may comprise 9-hydroxy stearic acid, 10-hydroxy stearic acid, 12-hydroxy stearic acid, or a mixture of two or more thereof. The esters may comprise one or more methyl esters or natural esters such as methyl 9-hydroxy stearate, methyl 10-hydroxy stearate, methyl 12-hydroxy stearate, hydrogenated castor bean oil, or a mixture of two or more thereof. The added carboxylic acid may comprise capric acid, lauric acid, myristic acid, palmitic acid, arachidic acid, behenic acid and/or lignoceric acid. The added carboxylic acid may comprise one or more of undecylenic acid, myristoleic acid, palmitoleic acid, oleic acid, gadoleic acid, elaidic acid, cis-eicosenoic acid, erucic acid, nervonic acid, 2,4-hexadienoic acid, linoleic acid, 12-hydroxy tetradecanoic acid, 10-hydroxy tetradecanoic acid, 12-hydroxy hexadecanoic acid, 8-hydroxy hexadecanoic acid, 12-hydroxy icosanic acid, 16-hydroxy icosanic acid 11,14-eicosadienoic acid, linolenic acid, cis-8,11,14-eicosatrienoic acid, arachidonic acid, cis-5,8,11,14,17-eicosapentenoic acid, cis-4,7,10,13,16,19-docosahexenoic acid, all-trans-retinoic acid, ricinoleic acid lauroleic acid, eleostearic acid, licanic acid, citronelic acid, nervonic acid, abietic acid, abscisic acid, or a mixture of two or more thereof. The added carboxylic acid may comprise palmitoleic acid, oleic acid, linoleic acid, linolenic acid, licanic acid, eleostearic acid, or a mixture of two or more thereof.

The added carboxylic acid may comprise iso-octanedioic acid, octanedioic acid, nonanedioic acid (azelaic acid), decanedioic acid (sebacic acid), undecanedioic acid, dodecanedioic acid, tridecanedioic acid, tetradecanedioic acid, pentadecanedioic acid, or a mixture of two or more thereof. The added carboxylic acid may comprise nonanedioic acid (azelaic acid). The added carboxylic acid may comprise decanedioic acid (sebacic acid).

The grease composition may be made by mixing the dispersion of metal oxide and/or hydroxide particulates, the animal and/or vegetable oil and optionally the added carboxylic acid and/or ester thereof at a temperature in the range from about 25° C. to about 220° C., and in one embodiment in the range from about 80° C. to about 180° C. The reaction may be conducted until the oil is thickened to a grease consistency. The term "grease consistency" may refer to a penetration according to ASTM D217 in the range from about 6 to about 475 tenths of a millimeter, and in one embodiment from about 200 to about 320 tenths of a millimeter. The reaction time may be in the range from about 35 to about 75 minutes, and in one embodiment in the range from about 35 to about 55 minutes.

In one embodiment, the reaction mixture for making the grease composition comprising the animal and/or vegetable oil and the dispersion of metal oxide and/or hydroxide particulates may be characterized by the absence of added carboxylic acid and/or ester thereof.

The grease composition may further comprise up to about 45% by weight soap, and in one embodiment from about 1 to about 45% by weight soap, and in one embodiment from about 4 to about 35% by weight soap. The soap may be formed by the saponification of one or more glycerides in the animal and/or vegetable oil, and/or one or more added carboxylic acids and/or esters thereof, with the metal oxide and/or hydroxide particulates.

The grease composition may further comprise one or more metal deactivators, antioxidants, antiwear agents, rust inhibitors, viscosity modifiers, extreme pressure agents, or a mixture of two or more thereof.

The metal deactivators may comprise one or more derivatives of benzotriazole, benzimidazole, 2-alkyldithiobenzimidazoles, 2-alkyldithiobenzothiazoles, 2-(N,N-dialkyldithiocarbamoyl)benzothiazoles, 2,5-bis(alkyldithio)-1,3,4-thiadiazoles, 2,5-bis(N,N-dialkyldithiocarbamoyl)-1,3,4-thiadiazoles, 2-alkyldithio-5-mercaptothiadiazoles or mixtures thereof.

The benzotriazole compounds may include hydrocarbyl substitutions at one or more of the following ring positions 1- or 2- or 4- or 5- or 6- or 7-benzotriazoles. The hydrocarbyl groups may contain from 1 to about 30 carbons, and in one embodiment from 1 to about 15 carbons, and in one embodiment from 1 to about 7 carbons. The metal deactivator may comprise 5-methylbenzotriazole.

The metal deactivator may be present in the grease composition at a concentration in the range up to about 5 percent by weight, and in one embodiment in the range about 0.0002 to about 2 percent by weight, and in one embodiment from about 0.001 to about 1 percent by weight.

The antioxidants may be selected from a variety of chemical types including phenate sulphides, phosphosulphurised terpenes, sulphurised esters, aromatic amines, and hindered phenols, or a mixture of two or more thereof.

The antioxidant may comprise one or more alkylated sterically hindered phenols. The alkyl groups may be branched or linear alkyl groups containing from 1 to about 24 carbon atoms, and in one embodiment about 4 to about 18 carbon atoms, and in one embodiment from about 4 to about 12 carbon atoms. The alkyl groups may be either straight chained or branched chained. The phenol may be a butyl substituted phenol containing two t-butyl groups. When the t-butyl groups occupy the 2- and the 6-positions, the phenol may be sterically hindered. Additionally the phenols may have additional substitution in the form of a hydrocarbyl, or a bridging group between two such aromatic groups. Bridging groups in the para position may include —CH$_2$— (methylene bridge) and —CH$_2$OCH$_2$— (ether bridge).

Another class of antioxidants that may be used comprises the diphenylamines. These compounds may be represented by the formula:

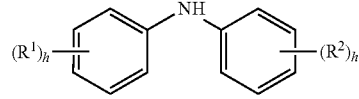

wherein R$^1$ and R$^2$ are independently hydrogen, an arylalkyl group or a linear or branched alkyl group containing from 1 to about 24 carbon atoms, and h is independently 0, 1, 2, or 3, provided that at least one aromatic ring contains an arylalkyl group or a linear or branched alkyl group. R$^1$ and R$^2$ may be alkyl groups containing from about 4 to about 20 carbon atoms. The diphenylamine may be mono- or di-nonylated diphenylamine.

The antioxidants may be present in the grease composition at a concentration up to about 12 weight percent, and in one embodiment in the range from about 0.1 to about 6 weight percent, and in one embodiment in the range from about 0.25 to about 3 weight percent.

The antiwear agent may comprise one or more metal thiophosphates. These may include zinc dialkyldithiophosphate, a phosphoric acid ester or salt thereof, a phosphite, or a phosphorus-containing ester, ether, or amide. The antiwear agent may be present at a concentration in the range up to about 10 weight percent, and in one embodiment in the range from about 0.1 to about 5 weight percent.

The rust inhibitor may comprise one or more metal sulphonates such as calcium sulphonate or magnesium sulphonate, amine salts of carboxylic acids such as octylamine octanoate, condensation products of dodecenyl succinic acid or anhydride and/or a fatty acid such as oleic acid with a polyamine, e.g. a polyalkylene polyamine such as triethylenetetramine, or half esters of alkenyl succinic acids in which the alkenyl group contains from about 8 to about 24 carbon atoms with alcohols such as polyglycols.

The rust inhibitors may present in the grease composition at a concentration in the range up to about 4 weight percent, and in one embodiment in the range from about 0.02 to about 2 weight percent, and in one embodiment in the range from about 0.05 to about 1 weight percent.

The viscosity modifier may comprise one or more polymeric materials including hydrogenated styrene-butadiene rubbers, ethylene-propylene copolymers, polyisobutenes, hydrogenated styrene-isoprene polymers, hydrogenated radical isoprene polymers, polymethacrylate acid esters, polyacrylate acid esters, polyalkyl styrenes, hydrogenated alkenyl arene conjugated diene copolymers, polyolefins, polyalkylmethacrylates, esters of maleic anhydride-styrene copolymers and mixtures thereof.

Some polymers can also be described as dispersant viscosity modifiers (often referred to as DVM) because they also exhibit dispersant properties. Polymers of this type may include polyolefins, for example, ethylene-propylene copolymers that have been functionalized by reaction with maleic anhydride and an amine. Another type of polymer that may be used is a polymethacrylate functionalized with an amine (this type can also be made by incorporating a nitrogen containing co-monomer in a methacrylate polymerization).

The viscosity modifiers may be present in the grease composition at a concentration in the range up to about 30 weight percent, and in one embodiment in the range from about 0.5 to about 20 weight percent, and in one embodiment in the range from about 1 to about 5 weight percent.

The extreme pressure (EP) agents that may be used may include one or more sulphur or chlorosulphur EP agents, chlorinated hydrocarbon EP agents, phosphorus EP agents, or mixtures of two or more thereof. Examples of such EP agents may include chlorinated wax, organic sulphides and polysulphides, such as benzyldisulphide, bis-(chlorobenzyl) disulphide, dibutyl tetrasulphide, sulphurised sperm oil, sulphurised methyl ester of oleic acid, sulphurised alkylphenol, sulphurised dipentene, sulphurised terpene, and sulphurised Diels-Alder adducts; phosphosulphurised hydrocarbons, such as the reaction product of phosphorus sulphide with turpentine or methyl oleate, phosphorus esters such as the dihydrocarbon and trihydrocarbon phosphites, i.e., dibutyl phosphite, diheptyl phosphite, dicyclohexyl phosphite, pentylphenyl phosphite; dipentylphenyl phosphite, tridecyl phosphite, distearyl phosphite and polypropylene substituted phenol phosphite; metal thiocarbamates such as zinc dioctyldithiocarbamate and barium heptylphenol diacid, zinc dicyclohexyl phosphorodithioate and the zinc salts of a phosphorodithioic acid combination.

The extreme pressure agents may be present in the grease composition at a concentration in the range up to about 10 weight percent, and in one embodiment in the range from about 0.25 to about 5 weight percent, and in one embodiment in the range from about 0.5 to about 2.5 weight percent.

The process for making the grease may allow for less severe reaction conditions compared to known methods by reducing the time of grease formation and decreasing the duration in the temperature versus time relationship to reach the peak temperature necessary for fiber formation.

The process for making grease may comprise a batch, semi-continuous or a non-batch process.

The grease compositions disclosed herein may include lithium soap greases, complex soap greases, lithium complex soap greases, calcium soap greases, low noise soap greases, short fiber high soap content greases, and the like.

The low noise greases may be used in rolling element bearing applications such as pumps or compressors. The complex soap greases may be smooth or show grain.

EXAMPLE 1

83.8 pounds (38.0 Kg) of lithium hydroxide monohydrate are dissolved in water to provide a 19.2% by weight aqueous mixture of lithium hydroxide monohydrate. This aqueous mixture is added with high shear mixing to 255.2 pounds (115.8 kg) of an oil solution of a polyisobutylene substituted succinimide over a period of 65 minutes. The oil is Group I, 325 neutral oil. The resulting mixture contains 11.9% by weight lithium hydroxide monohydrate, 50.0% by weight water, 9.3% by weight of polyisobutylene substituted succinimide, and 28.8% by weight of oil. The water phase to oil phase weight ratio is 1.7:1. Water is removed to form a water-in-oil emulsion. The water-in-oil emulsion is dehydrated to form a dispersion. The dispersion is in the form of a desiccated lithium hydroxide dispersion, with a water content of 0.24% by weight as determined by distillation according to ASTM D95, a TBN of 362 mg KOH/g, and a lithium content of 3.74% by weight corresponding to 13% by weight of anhydrous lithium hydroxide. The lithium hydroxide is in the form of particulates with a mean particulate size less than 1.0 micron.

EXAMPLE 2

A one-gallon (3.79 liter) kettle is charged with 480 grams of soybean oil and 20 grams of the desiccated lithium hydroxide dispersion from Example 1. The resulting mixture is heated to a temperature of 120-128° C. with stirring, and then maintained at that temperature for 15 minutes. The temperature of the mixture is reduced to room temperature. The resulting grease is milled three times in a three-roll mill.

EXAMPLE 3

A grease composition is formed by mixing the grease of Example 2 with LZ 5235 at a weight ratio of grease to additive of 99:1. LZ 5235 is a commercial grease zinc-phosphorus-sulfur-nitrogen containing performance additive available from Lubrizol. The composition is tested using the procedure disclosed in ASTM D217 giving a NLGI 00 grade grease with a penetration of 416 tenths of a millimeter. The grease composition is tested using the ASTM D5707 test giving 0.41 millimeter of wear, and 0.092 coefficient of friction at 200N load for 2 hr duration. These results indicate that the grease composition exhibits enhanced low wear, frictional properties and load bearing properties.

EXAMPLE 4

A 250 ml beaker is charged with 91.52 grams of soybean oil and 19.5 grams of the desiccated 15.5% lithium hydroxide dispersion similar to the dispersion in Example 1. The resulting mixture is heated to a temperature of 120° C. with stirring, and then cooled to room temperature. The resulting composition is milled three times in a three-roll mill giving an estimated NLGI 3 consistency with a soap content of 33%.

EXAMPLE 5

37.88 g of soybean oil and 9.02 g of 12-hydroxystearic acid (12-HSTA) are mixed in a beaker. The mixture is heated to 80° C. until dissolution of the 12-HSTA. 4.88 g of the desiccated lithium hydroxide dispersion from Example 1 are added. An additional 25.32 g of soybean oil are added and the mixture is heated to 190° C. followed by cooling to 80° C. The mixture is milled three times on a three roll mill. The resulting grease contains 10.7% by weight soap, has a grease consistency, and a dropping point of 198° C.

EXAMPLE 6

4,870 kg of LiOH monohydrate, 490 kg of polyisobutenyl succinic anhydride, and 4.38 kg of 6 cSt polyalphaolefin oil are added together to form a slurry. The slurry is agitated using a lab scale Dyno-Mill ECM Multi-Lab horizontal bead mill using 1.0 mm yttria-treated zirconia (YTZ) beads with a rotor tip speed of 12 (m/s)$^{-1}$ and maximum outlet temperature of 71° C. The resulting LiOH monohydrate dispersion contains 5% by weight surfactant, 45% by weight of 6 cSt polyalphaolefin oil, 50% by weight LiOH monohydrate particulates. The LiOH monohydrate particulates have a mean particle size of 1.4 microns.

EXAMPLE 7

3233 g of the LiOH monohydrate dispersion from Example 6 are charged to a 5 liter round bottom flask fitted with condenser. Water is removed by heating to 113° C. under 5 mm Hg pressure. The resulting dispersion contains 36.37% by weight LiOH, 6.37% by weight polyisobutylene substituted succinimide, and 57.29% by weight 6 cSt polyalphaolefin. The dispersion has a TBN of 862, and contains 0.1% by weight water as determined by distillation according to ASTM D95. The dispersion remains stable with a very slight haze for a period of time exceeding 1 month.

EXAMPLE 8

442.8 g of soybean oil and 98 g of 12-hydroxystearic acid (12-HSTA) are added to a stainless steel Hobart mixing bowl. The mixture is heated to 82° C. until dissolution of the 12-HSTA. This is followed by the addition of 22.66 g of the LiOH monohydrate dispersion from Example 6. The mixture is heated to 190° C. over 60 minutes. The temperature is held at 188-193° C. for 10 minutes. 442.8 g of soybean oil are added over 30 minutes. The mixture is cooled to 60° C. and milled three times on a three roll mill. The resulting grease contains 10.0% by weight soap, and has a P60=294, and dropping point of 199° C.

While the invention has been explained in relation to various embodiments, it is to be understood that modifications thereof may become apparent to those skilled in the art upon reading the specification. Therefore, it is to be understood that the scope of the invention specified herein is intended to include all modifications that may fall within the scope of the appended claims.

The invention claimed is:

1. A biodegradable grease composition comprising the reaction product of a dispersion of metal oxide and/or hydroxide particulates with at least one hydroxystearic acid in at least one vegetable oil, the dispersion comprising an organic medium and the metal oxide and/or hydroxide particulates dispersed in the organic medium, the dispersion having a water content of up to about 0.5% by weight, the particulates having a mean particle size in the range up to about 15 microns, the reaction product having a grease consistency; and wherein the reaction product is prepared by mixing the dispersion, the at least one hydroxystearic acid, and the at least one vegetable oil;

wherein the metal of the metal oxide and/or hydroxide particulates comprises lithium;

wherein the concentration of the metal oxide and/or hydroxide particulates in the dispersion is from 10% to about 62% by weight;

wherein the vegetable oil is present in the grease from 80 to 90 percent by weight; wherein the dispersion is present in the reaction mixture from 1 to 10 percent by weight; wherein the hydroxystearic acid is present in the reaction mixture from 5 to 25 percent by weight; and wherein the resulting soap content in the grease is from 4 to 35 percent by weight.

2. The composition of claim 1 wherein the metal further comprises sodium, potassium, calcium, magnesium, barium, aluminum, or a mixture thereof.

3. The composition of claim 1 wherein the metal oxide and/or hydroxide comprises lithium oxide.

4. The composition of claim 1 wherein the organic medium comprises at least one dispersion oil and at least one surfactant.

5. The composition of claim 4 wherein the dispersion oil comprises natural oil, synthetic oil, or a mixture thereof.

6. The composition of claim 4 wherein the dispersion oil comprises mineral oil.

7. The composition of claim 4 wherein the dispersion oil comprises one or more polyalphaolefins.

8. The composition of claim 4 wherein the surfactant comprises polyisobutylene substituted succinic acid, polyisobutylene substituted succinic anhydride, a salt thereof, or a mixture thereof.

9. The composition of claim 1 wherein the dispersion comprises from about 1.5 to about 32% by weight metal.

10. The composition of claim 1 wherein the vegetable oil comprises soybean oil.

11. The composition of claim 10 wherein the vegetable oil further comprises at least one glyceride of at least one fatty acid, wherein fatty acid comprises oleic acid, palmitic acid, stearic acid, linoleic acid, linolenic acid, or a mixture of two or more thereof.

12. The composition of claim 1 wherein the composition comprises at least one soap.

13. The composition of claim 1 wherein the reaction mixture further comprises one or more monocarboxylic acids, one or more polycarboxylic acids, or a mixture of two or more thereof.

14. The composition of claim 1 wherein the hydroxystearic acid has from 2 to about 30 carbon atoms.

15. The composition of claim 1 wherein the hydroxystearic acid comprises 12-hydroxystearic acid.

16. The composition of claim 1 wherein the composition further comprises one or more metal deactivators, antioxidants, antiwear agents, rust inhibitors, viscosity modifiers, extreme pressure agents, or a mixture of two or more thereof.

17. A process for making grease, comprising:
(A) forming a slurry comprising metal oxide and/or hydroxide solids, water and an organic medium wherein the metal of the metal oxide and/or hydroxide solids comprises lithium;
(B) milling the slurry to form a water-in-oil emulsion comprising metal oxide and/or hydroxide particulates;
(C) dehydrating the emulsion to form a dispersion of the metal oxide and/or hydroxide particulates in the organic medium; and
(D) mixing the dispersion with a hydroxystearic acid and at least one vegetable oil, forming a reaction mixture, and reacting the metal oxide and/or hydroxide particulates with the hydroxystearic acid and the vegetable oil under conditions sufficient to thicken the oil to a grease consistency;

wherein the concentration of the metal oxide and/or hydroxide particulates in the dispersion is from 10% to about 62% by weight;

wherein the vegetable oil is present in the grease from 80 to 90 percent by weight; wherein the dispersion is present in the reaction mixture from 1 to 10 percent by weight; wherein the hydroxystearic acid is present in the reaction mixture from 5 to 25 percent by weight; and wherein the resulting soap content in the grease is from 4 to 35 percent by weight.

18. The process of claim 17 wherein the process further comprises mixing metal oxide and/or hydroxide solids with the dispersion of metal hydroxide particulates formed in (C) to form a dispersion mixture; and milling the dispersion mixture to form a second dispersion comprising metal oxide and/or hydroxide particulates.

19. The composition of claim 1 wherein the organic medium comprises at least one dispersion oil and at least one surfactant wherein the dispersion oil comprises natural oil, synthetic oil, or a mixture thereof and wherein the surfactant comprises polyisobutylene substituted succinic acid, polyisobutylene substituted succinic anhydride, a salt thereof, or a mixture thereof; wherein the animal and/or vegetable oil comprises soybean oil.

20. The process of claim 17 wherein the organic medium comprises at least one dispersion oil and at least one surfactant wherein the dispersion oil comprises natural oil, synthetic oil, or a mixture thereof and wherein the surfactant comprises polyisobutylene substituted succinic acid, polyisobutylene substituted succinic anhydride, a salt thereof, or a mixture thereof; wherein the animal and/or vegetable oil comprises soybean oil.

* * * * *